United States Patent [19]
Wiesner et al.

[11] Patent Number: 4,735,465
[45] Date of Patent: Apr. 5, 1988

[54] ARRANGEMENT FOR THE CONNECTION OF THE TRACK LINKS OF ENDLESS CRAWLER TRACK VEHICLES

[75] Inventors: Hagen H. Wiesner, Solingen Burg; Günter Erlenmaier, Vellmar; Klaus Spies, Remscheid, all of Fed. Rep. of Germany

[73] Assignee: Diehl GmbH & Co., Nurenberg, Fed. Rep. of Germany

[21] Appl. No.: 865,923

[22] Filed: May 14, 1986

Related U.S. Application Data

[63] Continuation of Ser. No. 562,461, Dec. 16, 1983, abandoned.

[30] Foreign Application Priority Data

Dec. 18, 1982 [DE] Fed. Rep. of Germany ....... 3246935

[51] Int. Cl.$^4$ .............................................. B62D 55/21
[52] U.S. Cl. .................................. 305/58 PC; 428/367
[58] Field of Search ..................... 305/58 PC; 428/367

[56] References Cited

U.S. PATENT DOCUMENTS

| | | | |
|---|---|---|---|
| 4,093,319 | 6/1978 | Börner | 305/58 PC |
| 4,123,947 | 11/1978 | Smith et al. | 474/207 |
| 4,150,856 | 4/1979 | Hakkenberg et al. | 305/58 R |
| 4,173,670 | 11/1979 | Van Auken | 428/367 |
| 4,175,798 | 11/1979 | Korner et al. | 305/58 R |
| 4,262,972 | 4/1981 | Falk | 305/58 PC |
| 4,328,272 | 5/1982 | Maistre | 428/367 |

FOREIGN PATENT DOCUMENTS

| | | | |
|---|---|---|---|
| 1572963 | 8/1980 | United Kingdom | |
| 2083163 | 3/1982 | United Kingdom | 305/58 PC |
| 2112721 | 7/1983 | United Kingdom | 301/63 PW |

Primary Examiner—Robert B. Reeves
Assistant Examiner—Carol L. Olson
Attorney, Agent, or Firm—Scully, Scott, Murphy & Presser

[57] ABSTRACT

An arrangement for the connection of track links of endless crawler track vehicles with articulated tracks and coupling chains, in which novel link pins, pursuant to their utilization in the articulated tracks or coupling chains, are provided with slide bearings or rubber bushings and connectors. The pins consist of carbon fiber-reinforced plastic material with highly stressable carbon fibers arranged in a matrix consisting of epoxy resin, polyamide or the like.

6 Claims, 2 Drawing Sheets

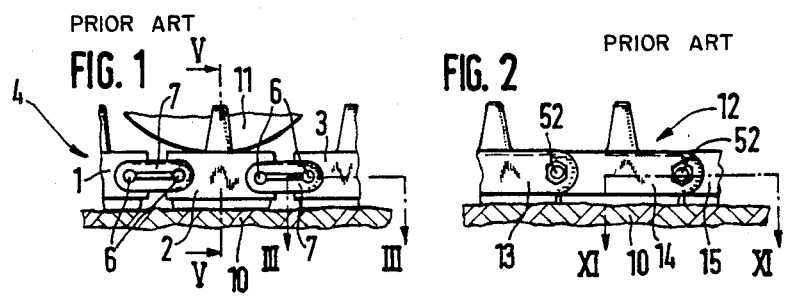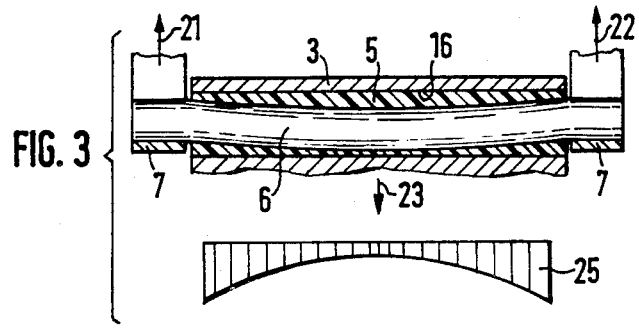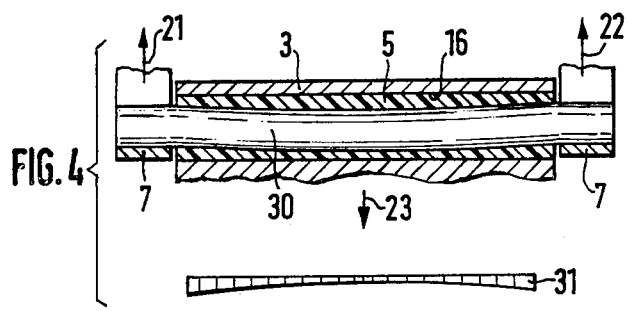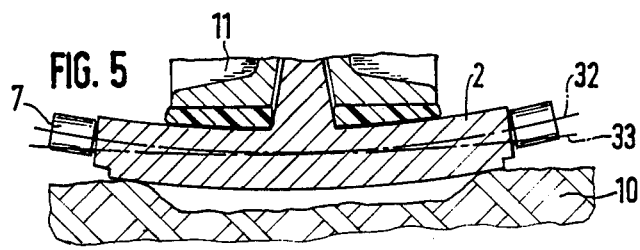

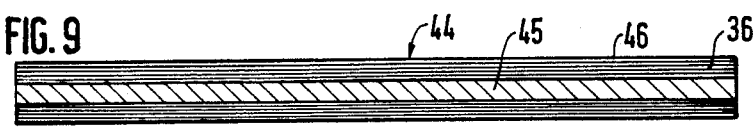
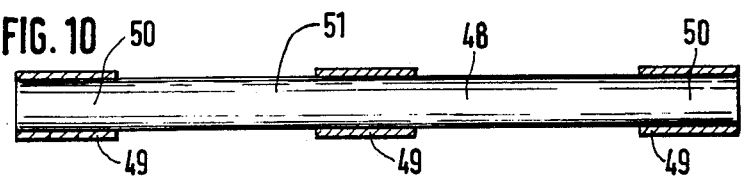
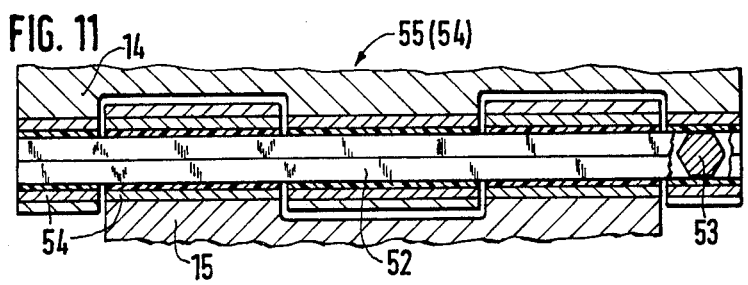
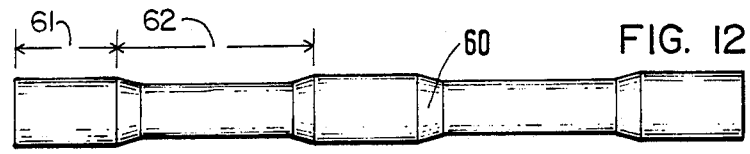
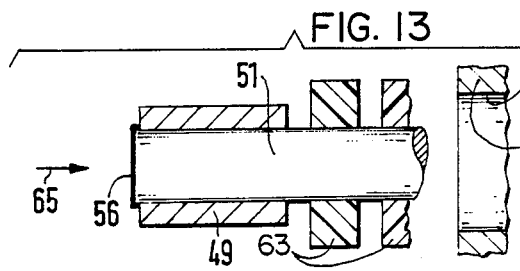

ARRANGEMENT FOR THE CONNECTION OF THE TRACK LINKS OF ENDLESS CRAWLER TRACK VEHICLES

This application is a continuation of application Ser. No. 562,461, filed Dec. 16, 1983, now abandoned.

BACKGROUND OF THE INVENTION

1. Field of the Invention

The present invention relates to an arrangement for the connection of track links of endless crawler track vehicles with articulated tracks and coupling chains, in which link pins, pursuant to their utilization in the articulated tracks or coupling chains, are provided with slide bearings or rubber bushings and connectors.

2. Discussion of the Prior Art

From German Laid-open patent application No. 27 21 018 there has become known a coupling chain in which the pins in the track links are supported within rubber bushings. The pins of neighboring track links are secured with each other against rotation through connectors.

Known from German Laid-open patent application No. 30 05 002 is an articulated track in which the pins in the articulated track links are also supported within rubber bushings.

In another articulated track as disclosed in German Laid-open patent application No. 30 37 979, a pin is rotatably supported within a bushing which is constituted of bearing metal.

The stability of the above-mentioned tracks, as a rule, depends upon the wear of the bearing for the pins. The pins bend differently under the load which is produced due to the track drive and under loads imparted to the track on the terrain. The different demands which are placed on the pins during vehicle travel will, during the course of time, lead to damages to the rubber bushings or damages to the pins and the bearing sleeves which are constructed of metal. In this regard, it has already become known from U.S. Pat. No. 3,227,586 to produce a tubular steel pin with hardened zones extending about its circumference. The susceptibility to wear of the pins was thus improved; however, not that of the bearing support of rubber or metal.

SUMMARY OF THE INVENTION

Accordingly, it is an object of the present invention to provide a pin, as an improvement of that in U.S. Pat. No. 3,227,586, which not only provides a service life which is comparable with that of the known pins, but which also significantly improves the service life of the bearing support for the pins in the track links.

The foregoing object is achieved pursuant to the invention through the provision of pins which consist of carbon fiber-reinforced plastic material with highly stressable carbon fibers arranged in a matrix consisting of epoxy resin, polyamide or the like.

The strength of pins formed from the plastic material reinforced with carbon fibers greatly exceeds that of known pins which are constructed of steel. The high degree of rigidity of the pins leads to a substantially lower extent of bending of the pins under loads. The load which is transmitted to the bearing which is constituted of rubber or metal acts as a fixed load and distributes the stresses in the bearing more uniformly in comparison with known arrangements, so as to lead to an increase in the service life of the bearing. The hardening which is usually encountered in steel pins as a result of frictional corrosion between the pins and connectors which are fixedly threaded thereto, is precluded in bolts which are produced of carbon fiber-reinforced plastic material. Also eliminated is any adverse influence on the strength of the pins through the effects of corrosion.

In accordance with the type of application, the deposition of the fibers is in the axial direction of the pin. Further fiber depositions may consist of a crossing fiber deposition, or of a combination of axially and crossing fiber deposition. The modulus of elasticity which is reached for the pins of fiber-reinforced plastic material lies at about 460,000 N/mm$^2$, and is thereby greater by a factor of 2 in comparison with steel.

The temperatures which are encountered in the pins during travel do not indicate any relevant reduction in the strength of the employed plastic material. The aging of carbon fiber-reinforced plastic material is avoidable through sealing of the surfaces which are exposed to the influences of weather, for example, through coating with metal or plastic material. The coating, by means of metal, renders the pin having a plastic matrix of epoxy resin insensitive to conflagration. In addition thereto, coming into consideration is also a matrix of a non-flammable plastic material, such as polyamide. A simple manufacture of the pins becomes possible through the utilization of a tubular or solid core. At the fastening or bearing locations of the pins, dependence upon the type of utilization, bushings formed of steel or bearing metal are fixedly connected with the pins.

For special instances of application, the pin is provided with a partial reduction in its diameter; thereby rendering the pin less expensive. The cross-section of the pin is to be formed, in a simple manner, produceable through unstressed or stress-relieving shaping into a circular, rectangular, oval or polygonal configuration with rounded edges. In contrast with steel pins, there is achieved a substantial reduction in weight by a factor of approximately 5.

BRIEF DESCRIPTION OF THE DRAWINGS

Reference may now be had to the following detailed description of exemplary embodiments of the invention, taken in conjunction with the accompanying drawings; in which:

FIG. 1 illustrates a generally schematic view of a track coupling chain;

FIG. 2 illustrates a generally schematic view of an articulated track;

FIG. 3 illustrates the load distribution on a pin pursuant to the state of the art in a track link, taken along section line III—III in FIG. 1;

FIG. 4 illustrates the load distribution in an inventive pin in a track link;

FIG. 5 illustrates the load condition in a pin in a track link during vehicle travel, taken along section line V—V in FIG. 1.;

FIGS. 6 through 12 respectively illustrate various embodiments of the inventive pin; and FIG. 13 illustrates a pin which is in readiness for assembly.

DETAILED DESCRIPTION

As illustrated in FIGS. 1 and 3 through 5 of the drawings, the track or chain links 1 to 3 of a coupling chain 4 are interconnected through steel pins 6 supported in rubber 5 and through connectors 7. The track links 1 to 3 are positioned on terrain 10. Rolling on the track links 1 through 3 is a sprocket drive wheel 11 of an endless crawler track vehicle (not shown).

In accordance with the illustration in FIG. 2 of the drawings, an articulated endless track 12 consists of track links 13 through 15 and an inventive pin pursuant to FIG. 11.

As shown in FIG. 3, the pin 6 is supported in the track link 1 by means of the rubber 5. Connectors 7 are fastened in a form-fitting and load-transmissive manner, as is known, to the pin 6. The rubber 5 is vulcanized onto the pin 6, and completely fills the bore 16. Forces act on the connectors 7 in the direction of arrows 21, 22, and on the track links 1 in the direction of arrow 23. The pin 6 bends as illustrated in the drawing, whereby the rubber 5 is correspondingly deformed. The load distribution in the rubber 5 is represented by the reference numeral 25.

According to FIG. 4 of the drawings, there are indicated the same relationships as regards FIG. 3. The pin 6 pursuant to FIG. 3 is replaced by an inventive pin 30. Obtained hereby is the substantially more satisfactory load distribution in the rubber in accordance with reference numeral 31.

Correspondingly suitable values for the load distribution are obtained in the same manner for the articulated track 12 pursuant to FIG. 2. An illustrative showing of the load distribution can thus be omitted in regard thereto.

In accordance with FIG. 5, a bending line 32 of the pin 6 (pursuant to the state of the art) is designated by 32, and the bending line relative to the inventive pin 30 by reference numeral 33. On the basis of bending line 33 there is obtained a correspondingly more suitable load distribution in the rubber 5.

The load distributions in conformance with the types of conditions as set forth in FIGS. 4 and 5 act in planes which stand at an angle of 90° relative to each other. The plane in which there lies the load distribution 31 is identical with the pulling direction of the track, whereas the not illustrated load distribution in conformance with bending line 33 is located in a plane which is normal to the pulling direction. Thereby it becomes evident that the rolling work of the rubber 5 is substantially less due to the utilization of the inventive pin 30 than that pursuant to the state of the art. Resulting therefrom is the relatively high service life of the rubber 5.

In accordance with FIG. 6, in one pin 35 the fiber deposition 36 extends in the longitudinal direction of the pin 35.

Pursuant to FIG. 7, in one pin 37 the fiber deposition 38 crosses over only in the outer layers (shell surface of the pin) to improve the mechanical properties of the surface. In the interior of the pin the fiber orientation or deposition 36 extends in the longitudinal direction of the pin 37.

In accordance with FIG. 8, a pin 40 contains a tubular core 41 which also consists of carbon fiber-reinforced plastic material. For the remainder, the fiber deposition 36 extends oriented in the longitudinal direction of the pin 40.

According to FIG. 9, a pin 44 includes a solid core 45 of carbon fiber-reinforced plastic material. The fiber deposition or orientation of the mantle 46 corresponds with that of FIG. 7.

The tubular core 41 and the solid core 45 can also consist of other materials such as metal.

According to FIG. 10, a pin 48 for the coupling track chain 1 is fixedly connected with steel bushings 49. Engaging these bushings 49 are the connectors 7 which are illustrated in FIG. 1. The bushings 49 protect the pin ends 50 from damage during assembly of the connectors 7 and increase frictional contact between the assembled pin 51 and connector 7.

According to FIG. 11, the track links 14 and 15 of the articulated crawler track 12 (FIG. 2) are hingedly connected to each other in a known manner through a pin 52 formed of carbon fiber reinforced plastic material having a hexagonal cross-sectional profile 53 and rubber-metal bushings 54.

In FIG. 12 there is illustrated a pin 60 formed of carbon fiber-reinforced plastic material, having portions 61, 62 of different diameters. The portion 61 can be directly connected with the connectors 7, or provided with metal bushings 49. Pursuant to FIG. 13, there is shown a portion of the pin 51 as in FIG. 10 with a steel bushing 49. The pin 51, on the surface thereof which is not covered by the bushing 49, is provided with a coating 56 of vapor deposited metal, such as aluminum, and which may be applied to the pin in any conventional manner. Besides the bushing 49, the pin 51 is formed of steel and the above-mentioned coating 56 has rubber rings 63 vulcanized thereon. The diameter of the rubber rings 63 is larger than the bores 16 of the endless crawler track link 2. The assembling of the pin 51 is effected in the direction of arrow 65 through a suitable tool. The rubber rings 63 are thereby deformed, and there is obtained a gapless support of the pin 51 in the track link 2.

The bearing support of rubber is possible by means of the previously mentioned carbon fiber-reinforced plastic material pin without influencing the performance date of the pin.

The volumetric component of the carbon fibers relative to the total volume of the pin consists of about 60%.

The carbon fiber-reinforced plastic material pin can evidence different cross-sections, such as circular, elliptical, oval, polygonal with edges or with rounded transitions.

What is claimed is:

1. In an arrangement for connecting track links of endless crawler track vehicles of the type having articulated track segments including pin receiving apertures, connecting pins extending through said apertures, and bearings mounted in the apertures and supporting the pins therein, the improvement comprising:

each pin defines an axis and extends through the pin receiving aperture of one of the track segments;

the pins are formed of a carbon fiber-reinforced plastic material having highly stressable carbon fibers arranged in a predetermined pattern, and wherein the pins include (i) solid inner cores wherein the carbon fibers extend longitudinally along the axes of the pins, and (ii) outer shells wherein the carbon fibers cross over each other to form an x-shaped pattern; and the bearings are flexible, and each bearing is vulcanized onto one of the pins and is held in a tight frictional engagement with the one track segment through which the one pin extends, wherein the bearing connects the one pin to the one track segment and supports the one pin in the aperture thereof for limited pivotal movement about the axis of the one pin.

2. An arrangement according to claim 1, wherein the bearings seal the space between the pins and the surfaces forming the pin receiving apertures.

3. An arrangement according to claim 2, wherein each pin includes first and second, opposite axial end faces, and further comprising metallic coatings applied on the end faces of the pins.

4. An arrangement according to claim 1, wherein each bearing includes:
   an inside circumferential surface rigidly fixed on one of the connecting pins;
   an outside circumferential surface rigidly fixed to one of the track segments; and
   a flexible body radially extending between the inside and outside circumferential surfaces.

5. An arrangement according to claim 1, wherein:
   each pin includes first and second end portions, and a central portion between the end portions;
   each track segment includes first and second connectors;
   the central portion of each pin is located in the pin receiving aperture of a first of a pair of adjacent track segments, and the first and second connectors of the second of the pair of track segments are mounted on the first and second end portions of the pin, respectively, to connect the pin to the second of the pair of track segments; and
   the arrangement further comprises a multitude of steel bushings, one of the bushings being fixed on each end portion of each pin, radially between the end portion and the connector mounted thereon.

6. An arrangement according to claim 1, wherein:
   each pin has a modulus of elasticity of about 460,000 N/mm$^2$; and
   the carbon fibers comprise about 60% of the total volume of each pin.

* * * * *